United States Patent
Torres Gonzalez et al.

(10) Patent No.: US 11,988,110 B2
(45) Date of Patent: May 21, 2024

(54) TURBINE AIRFOIL INCORPORATING MODAL FREQUENCY RESPONSE TUNING

(71) Applicant: SIEMENS ENERGY GLOBAL GMBH & CO. KG, Munich (DE)

(72) Inventors: Denis Torres Gonzalez, Orlando, FL (US); Matthew Golsen, Orlando, FL (US)

(73) Assignee: Siemens Energy Global GmbH & Co. KG, Munich (DE)

( * ) Notice: Subject to any disclaimer, the term of this patent is extended or adjusted under 35 U.S.C. 154(b) by 39 days.

(21) Appl. No.: 17/597,115

(22) PCT Filed: Apr. 24, 2020

(86) PCT No.: PCT/US2020/029674
§ 371 (c)(1),
(2) Date: Dec. 27, 2021

(87) PCT Pub. No.: WO2020/263396
PCT Pub. Date: Dec. 30, 2020

(65) Prior Publication Data
US 2022/0235664 A1    Jul. 28, 2022

Related U.S. Application Data

(60) Provisional application No. 62/868,318, filed on Jun. 28, 2019.

(51) Int. Cl.
*F01D 5/18* (2006.01)
*F01D 5/14* (2006.01)
(Continued)

(52) U.S. Cl.
CPC .............. *F01D 5/189* (2013.01); *F01D 5/147* (2013.01); *F01D 5/16* (2013.01); *F01D 5/20* (2013.01);
(Continued)

(58) Field of Classification Search
CPC . F01D 9/065; F01D 5/147; F01D 5/16; F01D 5/186–189; F01D 5/20; F01D 25/06; F01D 25/12
See application file for complete search history.

(56) References Cited

U.S. PATENT DOCUMENTS 4,500,258 A * 2/1985 Dodd ...................... F01D 5/187
416/97 R
7,556,476 B1  7/2009 Liang
(Continued)

FOREIGN PATENT DOCUMENTS

EP    1217171 A2    6/2002
EP    3144479 A1    3/2017
(Continued)

OTHER PUBLICATIONS

PCT International Search Report and Written Opinion of International Searching Authority dated Jul. 15, 2020 corresponding to PCT International Application No. PCT/US2020/029674 filed Apr. 24, 2020.

*Primary Examiner* — Courtney D Heinle
*Assistant Examiner* — Michael K. Reitz (57) ABSTRACT

A turbine airfoil includes an airfoil body and a generally hollow flow displacement element positioned in an interior portion of the airfoil body and extending along a span-wise extent thereof. The flow displacement element defines an inactive cavity therewithin. The flow displacement element is spaced from a pressure side wall and a suction side wall of the airfoil body to respectively define a first near-wall cooling flow channel and a second near-wall cooling flow channel. The flow displacement element includes an outer surface facing the near-wall cooling flow channels and an inner surface facing the inactive cavity. The inner surface facing the inactive cavity includes features configured to (Continued)

influence a mass and/or stiffness of the turbine airfoil, to thereby produce a predetermined modal frequency response of the turbine airfoil.

18 Claims, 8 Drawing Sheets

(51) Int. Cl.
  *F01D 5/16*  (2006.01)
  *F01D 5/20*  (2006.01)
  *F01D 25/12* (2006.01)
  *F01D 25/06* (2006.01)

(52) U.S. Cl.
  CPC .............. *F01D 25/12* (2013.01); *F01D 25/06* (2013.01); *F05D 2260/201* (2013.01); *F05D 2260/96* (2013.01)

(56) References Cited

U.S. PATENT DOCUMENTS

| | | |
|---|---|---|
| 2010/0129554 A1 | 5/2010 | Ahmad |
| 2015/0037165 A1 | 2/2015 | Jones et al. |
| 2017/0101893 A1* | 4/2017 | Marsh ................. F01D 5/18 |
| 2017/0248025 A1* | 8/2017 | Martin, Jr. ............. F01D 25/12 |
| 2019/0093487 A1 | 3/2019 | Marsh et al. |

FOREIGN PATENT DOCUMENTS

| | | | |
|---|---|---|---|
| JP | 2010525229 A | 7/2010 | |
| WO | 2017039571 A1 | 3/2017 | |
| WO | WO-2017039571 A1 * | 3/2017 | ............. F01D 5/187 |

* cited by examiner

FIG. 1

FIG. 2
VIEW II-II

TURBINE AIRFOIL INCORPORATING MODAL FREQUENCY RESPONSE TUNING

BACKGROUND

1. Field

The present disclosure relates to airfoils used in gas turbine engines, and in particular, to a turbine airfoil having a tuned modal frequency response and a method for forming such a turbine airfoil.

2. Description of the Related Art

In a turbomachine, such as a gas turbine engine, air is pressurized in a compressor section and then mixed with fuel and burned in a combustor section to generate hot combustion gases. The hot combustion gases are expanded within a turbine section of the engine where energy is extracted to power the compressor section and to produce useful work, such as turning a generator to produce electricity. The hot combustion gases travel through a series of turbine stages within the turbine section. A turbine stage may include a row of stationary airfoils, i.e., vanes, followed by a row of rotating airfoils, i.e., turbine blades, where the turbine blades extract energy from the hot combustion gases for providing output power.

Modal frequency response tuning of turbine airfoils involves modifying the airfoils to move the natural vibrational frequency of the airfoils outside of an operating speed range of the gas turbine engine, to avoid resonance. Modal frequency response tuning of turbine airfoils may be challenging due to the limited number of design parameters available to steer the design away from the resonance. Furthermore, the currently available design parameters are simultaneously coupled to several modal frequencies, which may result in design tradeoffs.

SUMMARY

Briefly, aspects of the present disclosure are directed to modal frequency response tuning of turbine airfoils by modifying a geometry of an internal flow displacement element.

According to a first aspect, a turbine airfoil is provided. The turbine airfoil comprises an airfoil body formed by an outer wall, the outer wall comprising a pressure side wall and a suction side wall joined at a leading edge and at a trailing edge. The turbine airfoil further comprises a generally hollow flow displacement element positioned in an interior portion of the airfoil body and extending along a span-wise extent thereof. The flow displacement element defines an inactive cavity therewithin. The flow displacement element is spaced from the pressure side wall and the suction side wall to respectively define a first near-wall cooling flow channel and a second near-wall cooling flow channel. The flow displacement element comprises an outer surface facing said near-wall cooling flow channels and an inner surface facing the inactive cavity. The inner surface facing the inactive cavity comprises features configured to influence a mass and/or stiffness of the turbine airfoil, to thereby produce a predetermined modal frequency response of the turbine airfoil.

According to a second aspect, a method is provided for forming a turbine airfoil with a tuned modal frequency response for use in a turbine engine. The method comprises obtaining a first geometry of the turbine airfoil. The first geometry is a nominal geometry of the turbine airfoil defined by: an airfoil body formed by an outer wall comprising a pressure side wall and a suction side wall joined at a leading edge and at a trailing edge, and a generally hollow flow displacement element positioned in an interior portion of the airfoil body and extending along a span-wise extent thereof. The flow displacement element defines an inactive cavity therewithin. The flow displacement element is spaced from the pressure side wall and the suction side wall to respectively define a first near-wall cooling flow channel and a second near-wall cooling flow channel. The flow displacement element comprises an outer surface facing said near-wall cooling flow channels and an inner surface facing the inactive cavity. The method comprises determining a first natural frequency associated with the first geometry of the turbine airfoil and determining whether the first natural frequency occurs within a defined operating speed range of the turbine engine. The method further comprises determining a second geometry of the turbine airfoil, the second geometry differing from the first geometry in the provision of mass and/or stiffness influencing features on the inner surface of the flow displacement element facing the inactive cavity. The second geometry is associated with a second natural frequency that occurs outside the defined operating speed range of the turbine engine. The method then comprises manufacturing the turbine airfoil based on the determined second geometry.

BRIEF DESCRIPTION OF THE DRAWINGS

The invention is shown in more detail by help of figures. The figures show preferred configurations and do not limit the scope of the invention.

DETAILED DESCRIPTION

In the following detailed description of the various embodiments, reference is made to the accompanying drawings that form a part hereof, and in which is shown by way of illustration, and not by way of limitation, a specific embodiment in which the invention may be practiced. It is to be understood that other embodiments may be utilized and that changes may be made without departing from the spirit and scope of the present invention.

Modal frequency response tuning may be achieved via airfoil design modifications, such as by modifying the airfoil chord, camber, twist, etc., blade shank redesign, internal rib positioning, among others. All of these design aspects are directly coupled to thermal and/or aerodynamic efficiency of the engine. The present inventors recognize that a modification of one or more of the above design aspects often leads to a compromise in performance and/or mechanical integrity of the engine.

The embodiments described herein eliminate at least some of the tradeoffs between aerodynamic efficiency, coolant reduction and modal frequency response tuning that are faced in the state of the art, offering a design strategy that allows independent efficiency optimization in each of the above-mentioned categories. The above may be achieved by providing mass and/or stiffness influencing features in an internal flow displacement element of a turbine airfoil, to tune a modal frequency response, without altering the geometry of the internal cooling flow channels and the external shape of the turbine airfoil. The concepts described herein may be extended to multiple stages of blades and vanes to provide significant aero gains and increase in turbine overall efficiency.

Figure 1:
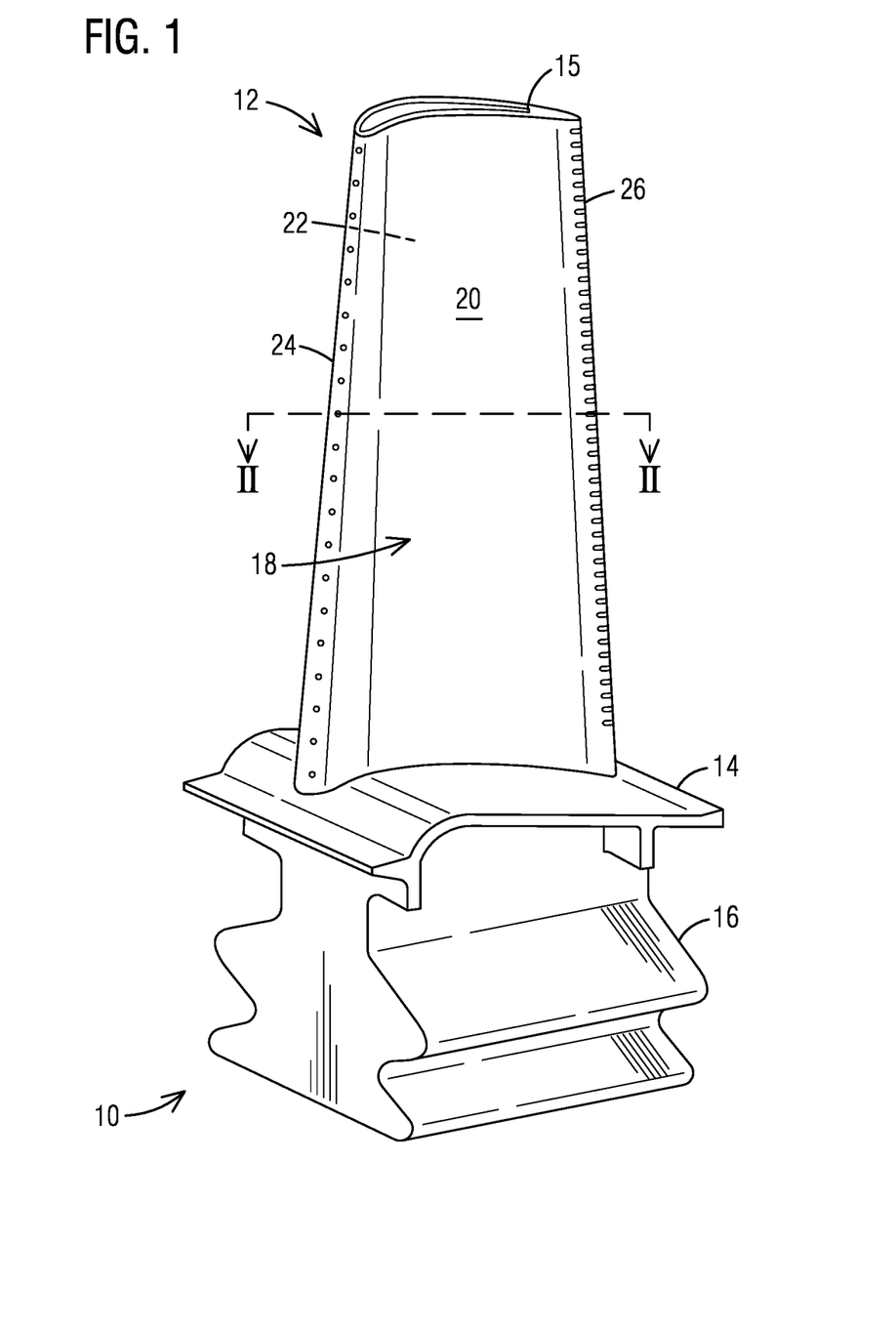
FIG. 1 is a perspective view of a turbine airfoil.

Referring now to FIG. 1, an example turbine airfoil 10 is illustrated. In this example, the airfoil 10 is a turbine blade of a gas turbine engine. It should however be noted that aspects of the invention could also be incorporated into a stationary vane of a gas turbine engine. The illustrated airfoil 10 includes an airfoil body 12 formed from an outer wall 18 adapted for use, for example, in a turbine section of an axial flow gas turbine engine. The outer wall 18 extends span-wise along a radial direction of the turbine engine and includes a generally concave shaped pressure side wall 20 and a generally convex shaped suction side wall 22. The pressure side wall 20 and the suction side wall 22 are joined at a leading edge 24 and at a trailing edge 26. As illustrated, the airfoil body 12 extends radially outward from a platform 14 toward a tip 15 of the turbine airfoil 10. A root portion 16 extends radially inward from the platform 14, for coupling the turbine airfoil 10 to a rotor disc (not shown). In the present description, a radial or span-wise direction is understood to be a direction extending from the root portion 16 toward the tip 15 of the turbine airfoil.

Figure 2:
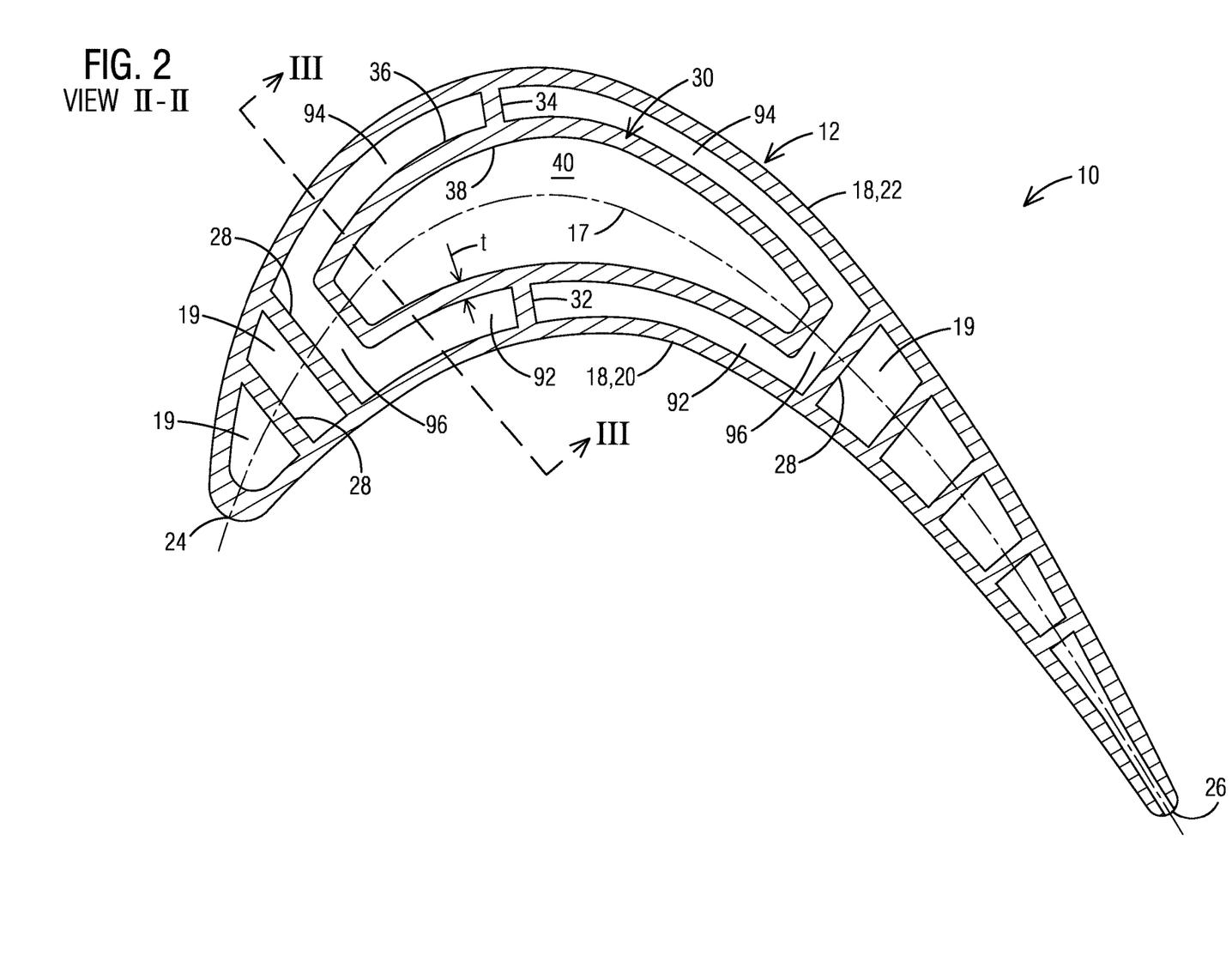
FIG. 2 is a cross-sectional view along the section II-II of FIG. 1.
Figure 3:
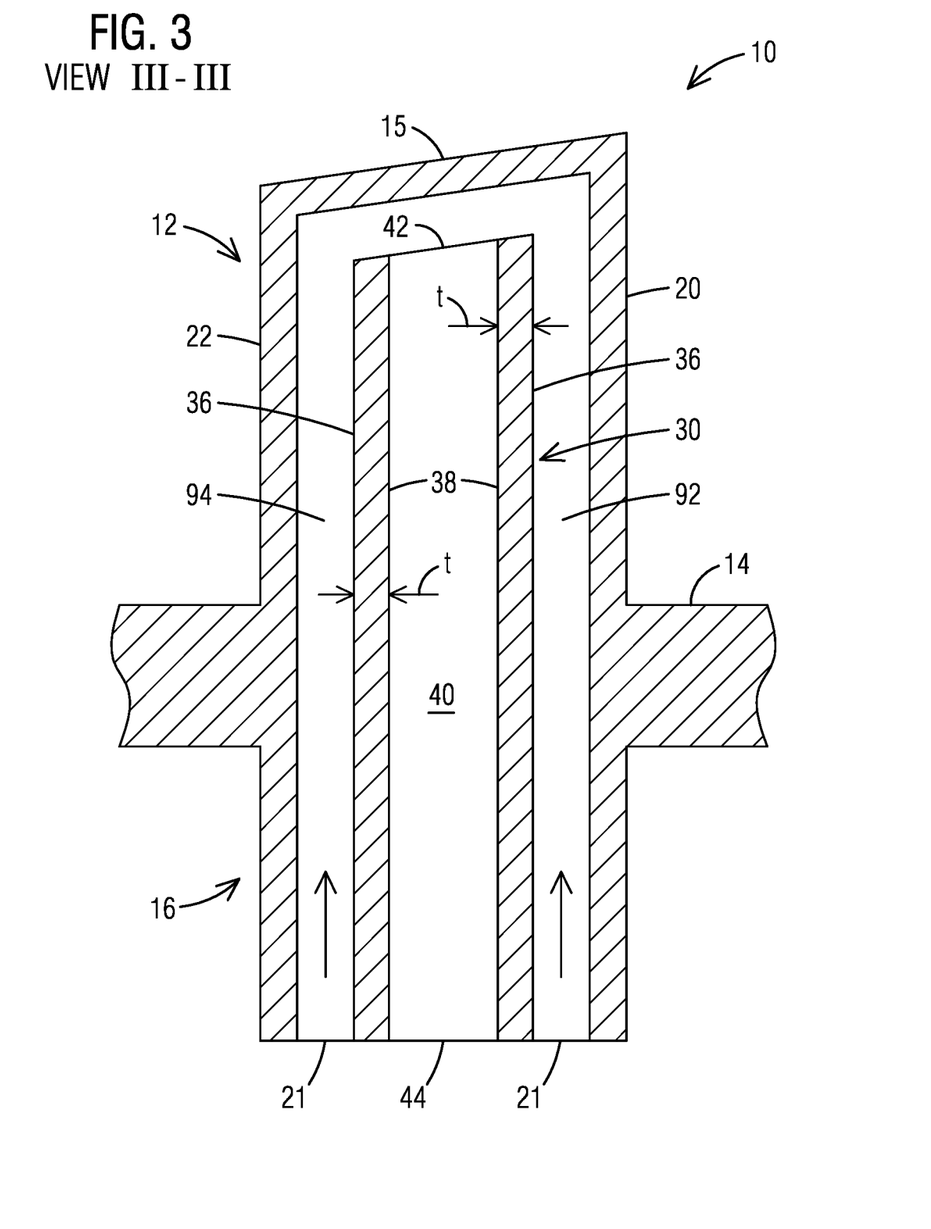
FIG. 3 is a cross-sectional view along the section of FIG. 2, illustrating a nominal geometry of an internal flow displacement element.

FIGS. 2 and 3 are cross-sectional views depicting a nominal or first geometry of the turbine airfoil 10. Referring to FIG. 2, the turbine airfoil 10 has a chordal axis 17 extending centrally between the pressure side wall 20 and the suction side wall 22 from the leading edge 24 to the trailing edge 26. A chord-wise direction may be defined as a direction parallel to the chordal axis 17. As illustrated, the airfoil body 12 comprises an interior portion which may receive a cooling fluid, such as air from a compressor section (not shown), via one or more cooling fluid supply passages formed through the root portion 16. In the present embodiment, the turbine airfoil 10 comprises a plurality of span-wise extending partition walls 28 positioned in the interior portion of the airfoil body 12. The partition walls 28 connect the pressure side wall 20 and the suction side wall 22 and are spaced along a chord-wise direction to define radial cooling flow channels 19 therebetween. The turbine airfoil 10 comprises at least one flow displacement element 30 positioned in the interior portion of the airfoil body 12 and extending along a span-wise extent thereof. In the shown example, the flow displacement element 30 is positioned between a pair of adjacent partition walls 28. The flow displacement element 30 is generally hollow, defining an internal cavity 40 within. The flow displacement element 30 is spaced from the pressure side wall 20 and the suction side wall 22 to respectively define a first near-wall cooling flow channel 92 and a second near-wall cooling flow channel 94. In the shown embodiment, a connecting channel 96 is formed between the flow displacement element 30 and an adjacent partition wall 28, which connects the near-wall cooling flow channels 92 and 94 to form a radial flow pass with a C-shaped cross-section.

The flow displacement element 30 may be manufactured integrally with the airfoil body. In the shown embodiment, the turbine airfoil 10 is provided with a pair of connector ribs 32, 34 that respectively connect the flow displacement 30 element to the pressure side wall 20 and to the suction side wall 22 along a span-wise extent. As a result, a pair of C-shaped radial flow passes of symmetrically opposed cross-sections are formed on either side of the connector ribs 32, 34. In other embodiments, additionally or alternately, connector ribs may be provided to connect the flow displacement element 30 one or more of the partition walls 28.

The cavity 40 defined within the flow displacement element 30 is an inactive cavity. That is to say that the cavity 40 is a dead space that does not allow any active flow of fluids. The flow displacement element 30 thereby serves to reduce the cross-sectional area of the radial flow of the cooling fluid and to displace the cooling fluid toward the pressure side 20 and the suction side 22, i.e., move a major part of the cooling fluid into the near-wall cooling flow channels 92 and 94. As shown in FIG. 3, the inactive cavity 40 extends span-wise from a first end 42 to a second end 44. In the shown embodiment, the first end 42 is located proximate to the tip 15 and the second end 44 is located at the root portion 16. The inactive cavity 40 is open at the first end 42, and closed at the second end 44. The near-wall cooling flow channels 92 and 94 are connected to a cooling fluid inlet 21 located at the root portion 16. The flow displacement element 30 comprises an outer surface 36 facing the near-wall cooling flow channels 92, 94 and an inner surface 38 facing the inactive cavity 40. In the nominal geometry shown in FIGS. 2 and 3 the outer surface 36 and the inner surface 38 of the flow displacement element 30 are generally parallel to each other, such that a wall thickness t of the flow displacement element 30, defined between the outer surface 36 and the inner surface 38, is substantially constant along the span-wise and chord-wise directions.

In accordance with the present disclosure, a modal frequency response of the turbine airfoil may be tuned by modifying the first (nominal) geometry of the turbine airfoil to form a second (adapted) geometry having a predetermined modal frequency response. In particular, the second geometry may be determined such that the turbine airfoil has a natural (modal) frequency that occurs outside a defined normal operating speed range of the turbine engine. The second geometry essentially differs from the first geometry in the provision of mass and/or stiffness influencing features 50 on the inner surface 38 of the flow displacement element 30 facing the inactive cavity 40. Examples of such mass and/or stiffness influencing features 50 are illustrated referring to FIG. 4-7.

Figure 4:
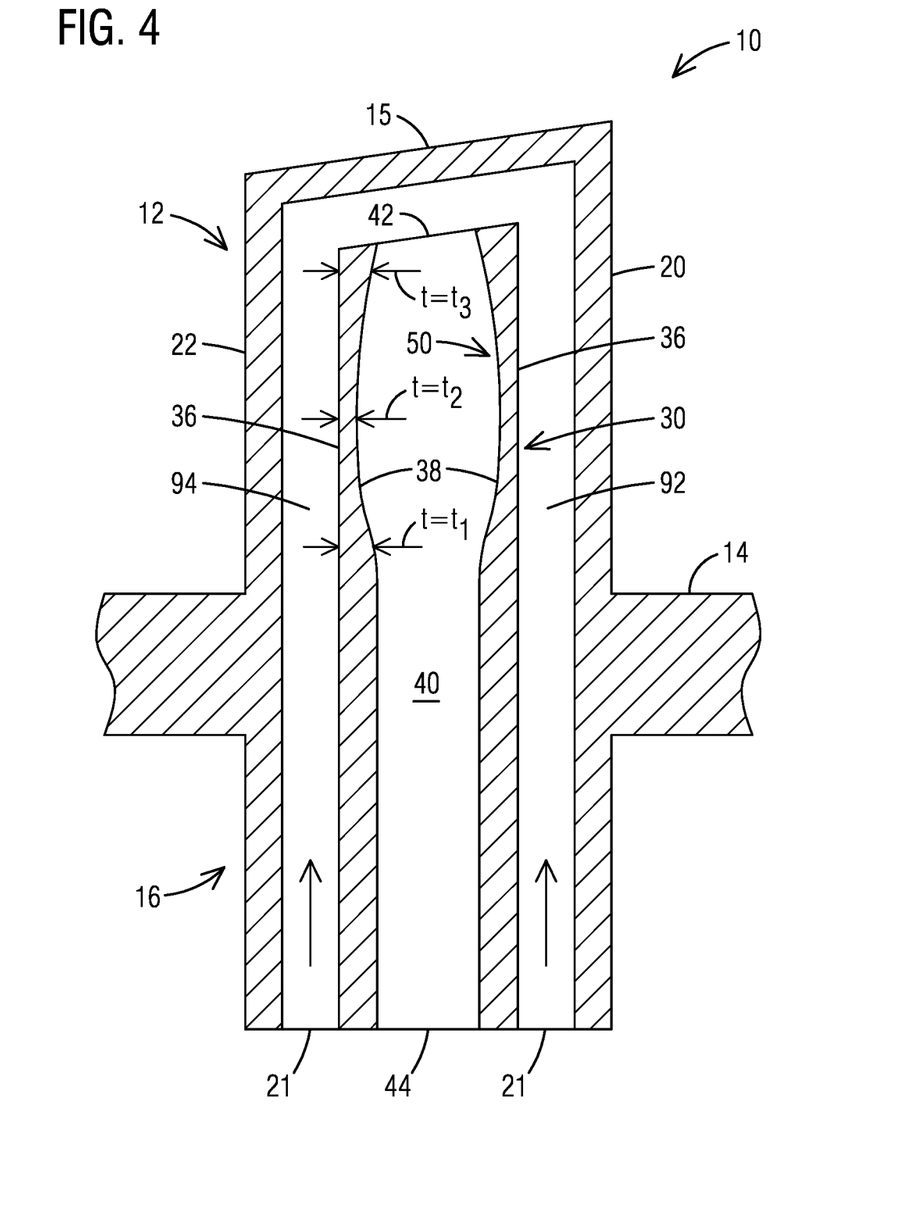
FIG. 4 is a cross-sectional view, corresponding to the view of FIG. 3, illustrating a modified geometry of the internal flow displacement element according to one embodiment.

In a first embodiment of an adapted geometry shown in FIG. 4, the mass and/or stiffness influencing features 50 are realized by providing a contour to the inner surface 38 of the flow displacement element 30, such that the flow displacement element 30 has an altered wall thickness t at one or more locations in relation to the first geometry of the turbine airfoil 10 (see FIG. 3). The view shown in FIG. 4 illustrates a two-dimensional contouring of the surface 38, whereby the wall thickness t of the flow displacement element 30 is varied in the span-wise direction. In an alternate embodiment, the surface 38 may be provided with a two-dimensional contouring, whereby the wall thickness t of the flow displacement element 30 is varied in the chord-wise direction. In a still alternate embodiment, the surface 38 may be provided with a three-dimensional contouring, whereby the wall thickness t of the flow displacement element 30 is varied in both the span-wise and chord-wise directions. The wall thickness distribution of the flow displacement element 30 may be designed to customize both the stiffness and mass of the turbine airfoil 10 and drive the modal frequencies up or down to avoid a resonance within the defined normal operating speed range of the turbine engine. In one embodiment, the inner surface 38 of the flow displacement element may be contoured by determining thicknesses t1, t2, t3 at various span-wise (and/or chord-wise) sections, to achieve a defined modal frequency response, and joining the sections by a smooth function curve. In other embodiments, the inner surface 38 of the flow displacement element 30 may be three-dimensionally contoured to define one or more crests (hills), one or more troughs (valleys), or a combination of crests and troughs.

Figure 5:
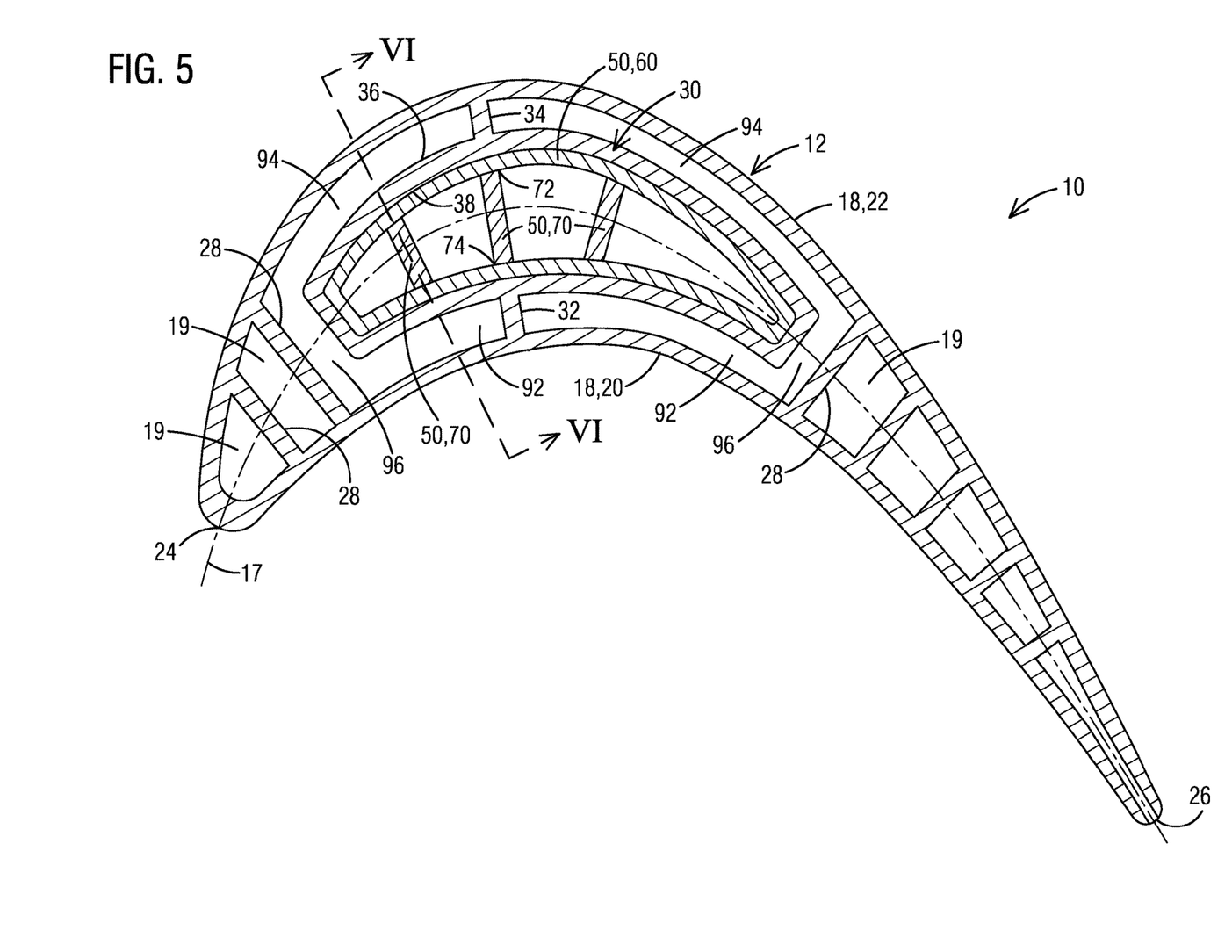
FIG. 5 is a cross-sectional view, corresponding to the view of FIG. 2, illustrating a modified geometry of the internal flow displacement element according to further embodiments.
Figure 6:
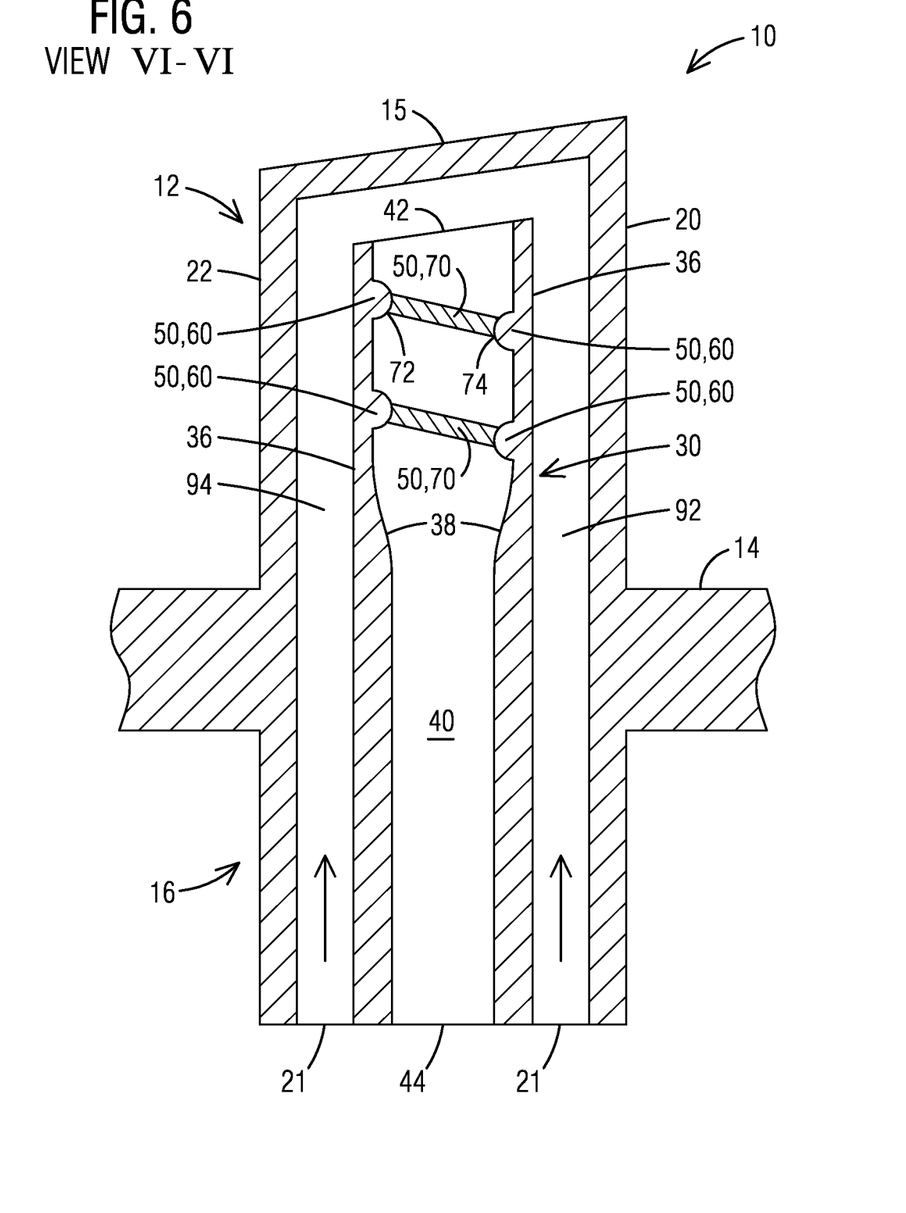
FIG. 6 is a cross-sectional view along the section VI-VI of FIG. 5.

Turning now FIGS. 5 and 6, a second embodiment of an adapted geometry of a turbine airfoil is illustrated that employs multiple different types of mass and/or stiffness influencing features 50. A first type of mass and/or stiffness enhancing feature 50 depicted herein includes one or more chord-wise extending protrusions 60 on the inner surface 38 of the flow displacement element 30. The chord-wise extending protrusions 60 have a significantly higher influence on the stiffness than the mass of the turbine airfoil 10, and may hence be referred to as stiffening bands. In another variant (not shown), the mass and/or stiffness influencing features may comprise one or more chord-wise extending depressions or grooves that may serve to reduce the overall stiffness of the turbine airfoil. A second type of mass and/or stiffness influencing features 50 depicted herein includes one or more rods 70 located at an interior of the flow displacement element 30. Each rod 70 extends between a first end 72 and a second end 74. The first and second ends 72, 74 of each rod 70 are connected to the inner surface 38 of the flow displacement element 30 at a first and a second location respectively. As a result, the rods 70 also have a significantly higher influence on the stiffness than the mass of the turbine airfoil 10, and may hence be referred to stiffening rods. As shown in FIG. 5 the stiffening rods 70 may be arranged in a chord-wise extending array in the interior of the flow displacement element 30. Alternately or additionally, the stiffening rods 70 may be arranged in a span-wise extending array in the interior of the flow displacement element 30. In the illustrated embodiment, the first and second ends 72, 74 of the stiffening rods 70 are positioned on the stiffening bands 60.

Figure 7:
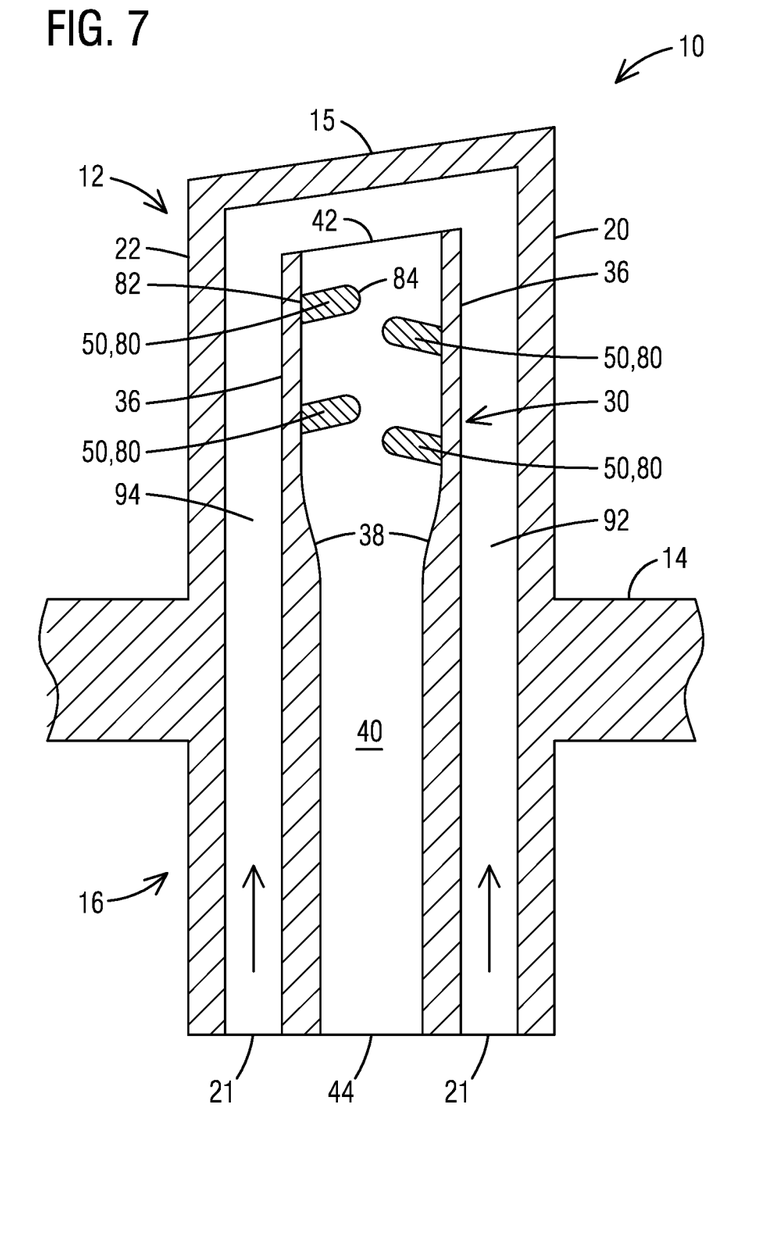
FIG. 7 is a cross-sectional view, corresponding to the view of FIG. 6, illustrating a modified geometry of the internal flow displacement element according to a still further embodiment.

Referring to FIG. 7, a third embodiment of an adapted geometry of a turbine airfoil is illustrated. Herein the mass and/or stiffness influencing features 50 comprise one or more cantilevered rods 80 located at an interior of the flow displacement element 30. Each cantilevered rod 80 extends from a first end 82 connected to the inner surface 38 of the flow displacement element 30 to a second end 84, the second end 84 being a free end. In this case, the cantilevered rods 80 have a significantly higher influence on the mass than the stiffness of the turbine airfoil 10.

In various embodiments, different types of mass and/or stiffness influencing features 50, such as a contoured inner surface 38, one or more stiffening bands 60, one or more stiffening rods 70 and one or more cantilevered rods 80 may be employed individually or as a combination of two or more different types of features to allow greater flexibility in designing a turbine airfoil with a predetermined modal frequency response.

Figure 8:
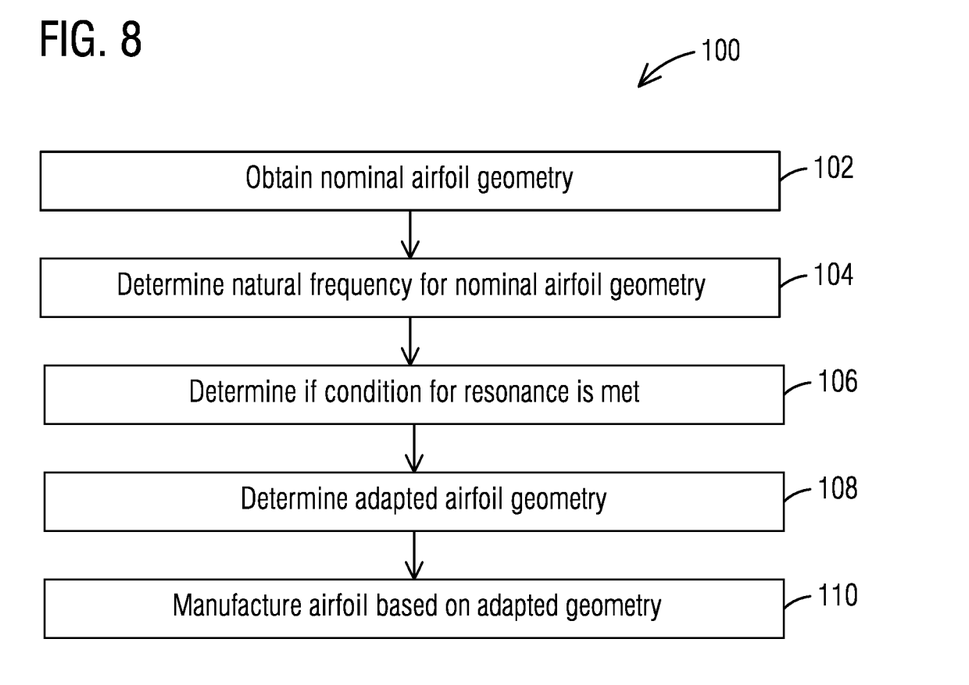
FIG. 8 is a flowchart illustrating a method for manufacturing an airfoil according to one embodiment.

FIG. 8 is a flowchart illustrating a method 100 for manufacturing a turbine airfoil according to one embodiment. Block 102 of the method 100 comprises obtaining a first geometry of the turbine airfoil, the first geometry being a nominal geometry of the turbine airfoil. The nominal geometry of the turbine airfoil may be obtained, for example, based on aerodynamic and heat transfer considerations, among other factors. To this end, the nominal geometry may specify an external geometry of the airfoil body and an internal geometry of the cooling channels of the turbine airfoil, among others. An example of a nominal geometry for a turbine airfoil is illustrated referring to FIG. 2-3. Block 104 of the method 100 includes determining at least one first natural frequency, corresponding to one or more vibration modes, associated with the first geometry of the turbine airfoil. Block 106 of the method 100 involves determining whether the above-determined natural frequency, for any of the vibration modes, occurs within a defined operating speed range of the turbine engine, i.e., determining whether a condition for resonance is met. In general, it is desirable to avoid one or more forced response drivers, such as, combustor can count, upstream vane count, etc., at all speeds within the defined speed range of the turbine engine. If a condition for resonance is determined, block 108 of the method 100 involves determining a second (adapted) geometry of the turbine airfoil 10. The second geometry differs from the first geometry in the provision of mass and/or stiffness influencing features 50 on the inner surface 38 of the flow displacement element 30 facing the inactive cavity 40. Examples of adapted geometries are illustrated referring to FIG. 4-7. The second (adapted) geometry is determined such that the associated second natural frequencies, for any of the vibration modes, occurs outside the defined operating speed range of the turbine engine. Block 110 of the method 100 involves manufacturing the turbine airfoil 10 based on the determined second geometry.

The above-described method provides significantly reduced complexity in relation to a conventional method of frequency response tuning of a turbine airfoil that would typically require a reevaluation of aerodynamic and cooling performance before the tuning change is accepted. By providing mass and/or stiffness influencing features 50 on a surface 38 facing an inactive cavity 40, it may be ensured that the near-wall cooling flow channels 92, 94 are essentially unaltered in the second geometry of the turbine airfoil 10 in relation to the first geometry of the turbine airfoil 10. The described embodiments do not depend on any external modification to the airfoil geometry such as chord, camber, twist, root redesign, etc., whereby the external geometry of the airfoil body 12 may also be unaltered in the second geometry of the turbine airfoil 10 in relation to the first geometry of the turbine airfoil 10. The embodiments described thus eliminate at least some of the tradeoffs between aerodynamic efficiency, coolant reduction and modal frequency response tuning, as faced in the state of the art.

In an example embodiment, the flow displacement element 30 may be formed integrally with the airfoil body 12. In this case, the manufacturing process may involve any technique that does not require post manufacturing assembly as in the case of inserts. In one example, the flow displacement element 30 may be cast integrally with the airfoil body 12, for example from a ceramic casting core. Other manufacturing techniques may include, for example, additive manufacturing processes such as 3-D printing. This allows the inventive design to be used for highly contoured airfoils, including 3-D contoured blades and vanes.

While specific embodiments have been described in detail, those with ordinary skill in the art will appreciate that various modifications and alternative to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof

The invention claimed is:

1. A turbine airfoil comprising:
an airfoil body formed by an outer wall, the outer wall comprising a pressure side wall and a suction side wall joined at a leading edge and at a trailing edge,
a flow displacement element that is hollow positioned in an interior portion of the airfoil body and extending along a span-wise extent thereof, the flow displacement element defining an inactive cavity therewithin,
wherein the flow displacement element is spaced from the pressure side wall and the suction side wall to respectively define a first near-wall cooling flow channel and a second near-wall cooling flow channel,
wherein the flow displacement element comprises an outer surface facing said near-wall cooling flow channels and an inner surface facing the inactive cavity,
wherein the inner surface facing the inactive cavity comprises features configured to influence a mass and/or stiffness of the turbine airfoil, to thereby produce a predetermined modal frequency response of the turbine airfoil,
wherein said features are realized by providing a contour to the inner surface of the flow displacement element such that the flow displacement element has a variable wall thickness.

2. The turbine airfoil according to claim 1, wherein the inner surface of the flow displacement element is provided with a two-dimensional contouring, wherein the wall thickness of the flow displacement element varies along one of a span-wise direction and a chord-wise direction.

3. The turbine airfoil according to claim 1, wherein the inner surface of the flow displacement element is provided with a three-dimensional contouring, wherein the wall thickness of the flow displacement element varies along a span-wise direction and a chord-wise direction.

4. The turbine airfoil according to claim 1, wherein said features comprise one or more cantilevered rods, each cantilevered rod extending from a first end connected to the inner surface of the flow displacement element to a second end, the second end being a free end.

5. The turbine airfoil according to claim 1, wherein the flow displacement element is formed integrally with the airfoil body.

6. The turbine airfoil according to claim 5, further comprising a pair of connector ribs that respectively connect the flow displacement element to the pressure side wall and to the suction side wall along a span-wise extent.

7. The turbine airfoil according to claim 1, further comprising a plurality of span-wise extending partition walls positioned in the interior portion of the airfoil body and connecting the pressure side wall and the suction side wall, the partition walls being spaced along a chord-wise direction, wherein the flow displacement element is positioned to occupy a space between a pair of said adjacent partition walls.

8. The turbine airfoil according to claim 1, wherein the inactive cavity extends span-wise from a first end to a second end, the inactive cavity being open at the first end and closed at the second end.

9. The turbine airfoil according to claim 8, wherein the first end of the inactive cavity is located proximate to a tip of the turbine airfoil and the second end of the inactive cavity is located at a root portion of the turbine airfoil.

10. A turbine airfoil comprising:
an airfoil body formed by an outer wall, the outer wall comprising a pressure side wall and a suction side wall joined at a leading edge and at a trailing edge,
a flow displacement element that is hollow positioned in an interior portion of the airfoil body and extending along a span-wise extent thereof, the flow displacement element defining an inactive cavity therewithin,
wherein the flow displacement element is spaced from the pressure side wall and the suction side wall to respectively define a first near-wall cooling flow channel and a second near-wall cooling flow channel,
wherein the flow displacement element comprises an outer surface facing said near-wall cooling flow channels and an inner surface facing the inactive cavity,
wherein the inner surface facing the inactive cavity comprises features configured to influence a mass and/or stiffness of the turbine airfoil, to thereby produce a predetermined modal frequency response of the turbine airfoil,
wherein said features comprise one or more protrusions on the inner surface of the flow displacement element, each protrusion extending along an entire chord-wise extent of the inactive cavity to form a stiffening band.

11. A turbine airfoil comprising:
an airfoil body formed by an outer wall, the outer wall comprising a pressure side wall and a suction side wall joined at a leading edge and at a trailing edge,
a flow displacement element that is hollow positioned in an interior portion of the airfoil body and extending along a span-wise extent thereof, the flow displacement element defining an inactive cavity therewithin,
wherein the flow displacement element is spaced from the pressure side wall and the suction side wall to respectively define a first near-wall cooling flow channel and a second near-wall cooling flow channel,
wherein the flow displacement element comprises an outer surface facing said near-wall cooling flow channels and an inner surface facing the inactive cavity,
wherein the inner surface facing the inactive cavity comprises features configured to influence a mass and/or stiffness of the turbine airfoil, to thereby produce a predetermined modal frequency response of the turbine airfoil,
wherein said features comprise one or more stiffening rods, each stiffening rod extending between a first end and a second end, the first and second ends of each stiffening rod being connected to the inner surface of the flow displacement element at a first and a second location respectively.

12. The turbine airfoil according to claim 11, wherein the stiffening rods are arranged in an array along a span-wise and/or chord-wise direction.

13. A method for forming a turbine airfoil with a tuned modal frequency response for use in a turbine engine, the method comprising:
obtaining a first geometry of the turbine airfoil, the first geometry being a nominal geometry of the turbine airfoil defined by:

an airfoil body formed by an outer wall, the outer wall comprising a pressure side wall and a suction side wall joined at a leading edge and at a trailing edge, a flow displacement element that is hollow positioned in an interior portion of the airfoil body and extending along a span-wise extent thereof, the flow displacement element defining an inactive cavity therewithin, wherein the flow displacement element is spaced from the pressure side wall and the suction side wall to respectively define a first near-wall cooling flow channel and a second near-wall cooling flow channel, wherein the flow displacement element comprises an outer surface facing said near-wall cooling flow channels and an inner surface facing the inactive cavity, determining a first natural frequency associated with the first geometry of the turbine airfoil and determining whether the first natural frequency occurs within a defined operating speed range of the turbine engine, determining a second geometry of the turbine airfoil, the second geometry differing from the first geometry in the provision of mass and/or stiffness influencing features on the inner surface of the flow displacement element facing the inactive cavity, such that the second geometry is associated with a second natural frequency that occurs outside the defined operating speed range of the turbine engine, and manufacturing the turbine airfoil based on the determined second geometry, wherein said mass and/or stiffness influencing features are defined by contouring the inner surface of the flow displacement element such that the flow displacement element has variable wall thickness in the second geometry of the turbine airfoil.

14. The method according to claim 13, wherein the near-wall cooling flow channels are unaltered in the second geometry of the turbine airfoil in relation to the first geometry of the turbine airfoil.

15. The method according to claim 13, wherein an external geometry of the airfoil body is unaltered in the second geometry of the turbine airfoil in relation to the first geometry of the turbine airfoil.

16. The method according to claim 13, wherein said mass and/or stiffness influencing features are defined by providing one or more protrusions on the inner surface of the flow displacement element, each protrusion extending along a chord-wise extent to form a stiffening band.

17. The method according to claim 13, wherein said mass and/or stiffness influencing features are defined by providing one or more rods connected to the inner surface of the flow displacement element.

18. The method according to claim 13, comprising forming the flow displacement element integrally with the airfoil body.

\* \* \* \* \*